(12) United States Patent
Herman et al.

(10) Patent No.: US 10,934,087 B2
(45) Date of Patent: Mar. 2, 2021

(54) HIGH CAPACITY CONTAINER WITH MULTIPLE DISCHARGE LOCATIONS

(71) Applicant: Quickthree Technology LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 0 days.

(21) Appl. No.: 16/622,360

(22) PCT Filed: Jun. 13, 2018

(86) PCT No.: PCT/US2018/037185
§ 371 (c)(1),
(2) Date: Dec. 13, 2019

(87) PCT Pub. No.: WO2018/231888
PCT Pub. Date: Dec. 20, 2018

(65) Prior Publication Data
US 2020/0198885 A1    Jun. 25, 2020

(30) Foreign Application Priority Data
Jun. 16, 2017   (CA) .................................... 2970932

(51) Int. Cl.
*B65D 88/30* (2006.01)
*B65D 88/54* (2006.01)
(Continued)

(52) U.S. Cl.
CPC ............. *B65D 88/30* (2013.01); *B65D 88/54* (2013.01); *B65D 83/06* (2013.01); *B65D 88/12* (2013.01); *B65D 88/28* (2013.01); *B65D 90/54* (2013.01)

(58) Field of Classification Search
CPC ........ B65D 88/30; B65D 88/54; B65D 88/12; B65D 88/28; B65D 83/06; B65D 90/54
See application file for complete search history.

(56) References Cited

U.S. PATENT DOCUMENTS 3,217,364 A    11/1965   Genest
3,792,790 A *  2/1974   Brubaker .............. B65D 88/30
                                                    414/332

(Continued)

FOREIGN PATENT DOCUMENTS

| GB | 2132593 | 7/1984 |
| WO | 03/037752 | 5/2003 |

OTHER PUBLICATIONS

International Search Report and Written Opinion for PCT/US18/37185, dated Sep. 6, 2018.

*Primary Examiner* — Kaitlin S Joerger
(74) *Attorney, Agent, or Firm* — Sheehan Phinney Bass & Green, PA

(57) ABSTRACT

A container assembly comprises a container and a base and is configured to be transported horizontally to a work site where it is raised to a vertical working orientation. A hoppered container floor directs material to a discharge opening in a center of the floor of the container. A plurality of chutes is fixed to the container assembly and each slopes downward and outward from a chute input, located under a central portion of the hoppered floor, to a corresponding chute output. A distributor assembly mounted under the discharge opening receives granular material from the discharge opening and directs same into any one of the chute inputs. When loaded on a gooseneck trailer the container extends over the hitch assembly providing increased volume and capacity.

29 Claims, 3 Drawing Sheets

(51) Int. Cl.
    *B65D 88/12*       (2006.01)
    *B65D 88/28*       (2006.01)
    *B65D 83/06*       (2006.01)
    *B65D 90/54*       (2006.01)

(56) References Cited

U.S. PATENT DOCUMENTS

| | | | | |
|---|---|---|---|---|
| 6,238,145 | B1 * | 5/2001 | Paul | B65D 88/28 |
| | | | | 222/328 |
| 6,269,849 | B1 | 8/2001 | Fields, Jr. | |
| 7,513,280 | B2 * | 4/2009 | Brashears | B65D 88/28 |
| | | | | 141/100 |
| 7,946,796 | B2 * | 5/2011 | Halland | B65G 69/0441 |
| | | | | 414/299 |
| 9,499,335 | B2 * | 11/2016 | McIver | B60P 3/00 |
| 10,300,830 | B2 * | 5/2019 | McIver | B65D 88/32 |
| 10,406,962 | B2 * | 9/2019 | Hughes | B65D 88/32 |
| 2006/0096837 | A1 | 5/2006 | Sanders | |
| 2011/0014020 | A1 | 1/2011 | Thiessen et al. | |
| 2014/0224812 | A1 * | 8/2014 | Herman | B65D 25/42 |
| | | | | 220/601 |
| 2017/0327309 | A1 * | 11/2017 | Hunter | B65D 88/30 |
| 2020/0048020 | A1 * | 2/2020 | Warren | B65G 69/18 |

* cited by examiner

HIGH CAPACITY CONTAINER WITH MULTIPLE DISCHARGE LOCATIONS

CROSS-REFERENCE TO RELATED APPLICATIONS

This application is a national stage application, filed under 35 U.S.C. § 371, of International Application No. PCT/US18/37185, filed Jun. 13, 2018, which claimed the benefit of Canadian Patent Application. No. 2970932, filed Jun. 16, 2017. The contents of the prior applications are incorporated by reference herein in their entireties.

This invention is in the field of transporting and installing containers such as silos, bins, tanks, or the like, and in particular such containers that must be installed in a location at a work site with outlet ports located at a desired position, and where the desired position can change from one work site to another.

BACKGROUND

In many industries it is required to set up an array of equipment at a temporary work site, and then disassemble the installation, move it to another work site, and re-assemble it. For example asphalt and concrete plants are often set up in locations where large quantities of material are required for mad or building construction. Similarly well drilling rigs, such as those drilling for oil and gas, are set up at a drilling location, then taken down and moved to a different drilling location.

These portable plants and rigs typically require temporary storage for water, asphalt, sand, cement, and other materials such as might be required at any particular work site. Thus various tanks, bins, silos, and like containers are transported to the work site, commonly in a lowered horizontal transport orientation, and then raised to a vertical working orientation at the work site.

This vertical orientation reduces the ground area, or footprint, occupied by the installation. Also bins containing dry granular material especially are often elongated vertically when in a working position to maximize the quantity of material stored above a hoppered bottom such that the granular material will flow out by gravity. Containers holding granular material typically have a hoppered bottom with walls sloping toward an outlet port at the bottom of one side of the container so that all the material inside will flow out through the outlet port, leaving the container empty.

These containers are typically transported to the work site by flat-bed trucks or trailers in a lowered horizontal transport orientation. The trailer is maneuvered into position, and then the container is raised from the horizontal transport position to a vertical working position resting on the ground, and the trailer is moved away from the site. Such work sites are often crowded with such containers in order to place the maximum amount of material in the desired accessible location. The trailers carrying the required containers must be maneuvered along sometimes limited access routes into positions where the containers will be in a desired orientation when moved to the working position.

U.S. Pat. No. 8,939,697 to the present inventor Herman provides a transportable container with increased flexibility of positioning the container at a crowded work site. The container has a single output port in a lower side wall thereof however is attachable to the transporting trailer on three sides. Thus, with knowledge of the desired orientation of the output port at the work site and of the available routes to the container location, the container can be mounted to the trailer on a side thereof selected so that when unloaded and moved to the vertical operating position the outlet port is in a desired location.

Commonly the container includes a chute under the outlet port to direct granular material flowing from the port onto a conveyor belt or the like. The chute may be pivotally mounted to the container and/or telescoping to provide some flexibility to the discharge location and thus to the positioning of the container. The discharge location also must be at a sufficiently high vertical location that the receiving apparatus, such as a conveyor, blender, or the like can be positioned under the discharge.

Such containers are also known that have a center outlet port in the bottom, however a conveyor or the like is then required to receive the material and carry it to a location outside the container. Alternatively the container can be mounted on legs and a chute can receive the material and direct it to a location beside the container, however this makes containers of the same capacity somewhat higher and less stable.

U.S. Pat. No. 9,315,294, also to the present inventor Herman, addresses a stability problem with such vertical containers with an outlet port on one side. As granular material flows out of the outlet port, the material above the port inside the container flows out first and the level of granular material inside the container on the port side thereof above the fixed outlet port falls until the angle of repose of the particular material is reached, and material from the opposite side of the container begins to flow. Thus the loaded container is unbalanced, with more weight on the side opposite the port, making the container less stable, as the wind force necessary to be exerted on the port side of the container to tip the container over is reduced.

The Herman '294 container system has a lower section with a reduced diameter and the outlet port is in a sidewall of the lower section so that the center of gravity when the tank is partially full is closer to the center of the container, and stability is improved. Reducing the diameter of the lower section however reduces volume and capacity compared to a conventional container with a constant diameter from top to bottom.

In order to maximize capacity, the diameter of such transportable containers is typically the maximum allowable for movement along public roads. In order to keep within height restrictions the trailers used for transporting them are of the type commonly referred to as gooseneck trailers where the load bed is lower than the fifth wheel hitch of the highway tractors towing them, and a hitch assembly extends upward from the front end of the load bed and then forward over the fifth wheel hitch on the tractor.

SUMMARY OF THE INVENTION

The present disclosure provides a transportable container apparatus and method that overcome problems in the prior art.

In a first embodiment the present disclosure provides a transportable container apparatus comprising a container assembly comprising a container and a base, the container assembly configured to be transported to a work site in a substantially horizontal transport orientation, and to be raised to a substantially vertical working orientation with the container extending upward from the base. The container comprises a hoppered floor configured, when the container assembly is in the working orientation, to direct granular material in the container to a discharge opening substantially in a center of the hoppered floor of the container, and a gate mechanism operative to control a flow of granular material through the discharge opening. A plurality of chutes is fixed to the container assembly and configured such that when the container assembly is in the working orientation, each chute slopes downward and outward from a corresponding chute input, located under a central portion of the hoppered floor, to a corresponding chute output. A distributor assembly is mounted under the discharge opening and is operative, when the container assembly is in the working orientation, to receive granular material from the discharge opening and direct the received granular material into any one of the chute inputs, and a distributor control is operative to maneuver the distributor assembly to direct granular material into a selected chute input.

In a second embodiment the present disclosure provides a method of transporting a container and installing same at a work site in a substantially vertical working orientation to deposit granular material from the container into a receiving apparatus. The method comprises mounting the container in a container assembly comprising the container with a hoppered floor and a base; configuring the hoppered floor such that when the container assembly is in the working orientation, granular material in the container is directed to a discharge opening substantially in a center of the hoppered floor of the container; attaching a plurality of chutes to the container assembly and configuring the chutes such that when the container assembly is in the working orientation, each chute slopes downward and outward from a corresponding chute input, located under a central portion of the hoppered floor, to a corresponding chute output; transporting the container assembly to the work site on a trailer in a substantially horizontal transport orientation, and raising the container assembly to the working orientation at the work site with the container extending upward from the base resting on a ground surface, wherein a location of the container assembly and a location of the receiving apparatus are arranged such that the receiving apparatus receives granular material from the chute output of a selected chute; depositing the granular material into the container; and opening the discharge opening and directing granular material from the discharge opening into the chute input of the selected chute.

In the disclosed transportable container apparatus and method the apparatus is carried with one side thereof supported on a trailer and when the container apparatus is erected, granular material can be discharged to any one of the other three sides of the apparatus, providing considerable versatility in arranging the containers and receiving apparatuses in a crowded work site with limited access routes. The capacity of the container increases due to the extension of the container over the hitch assembly of a gooseneck trailer which increases the volume of the container.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
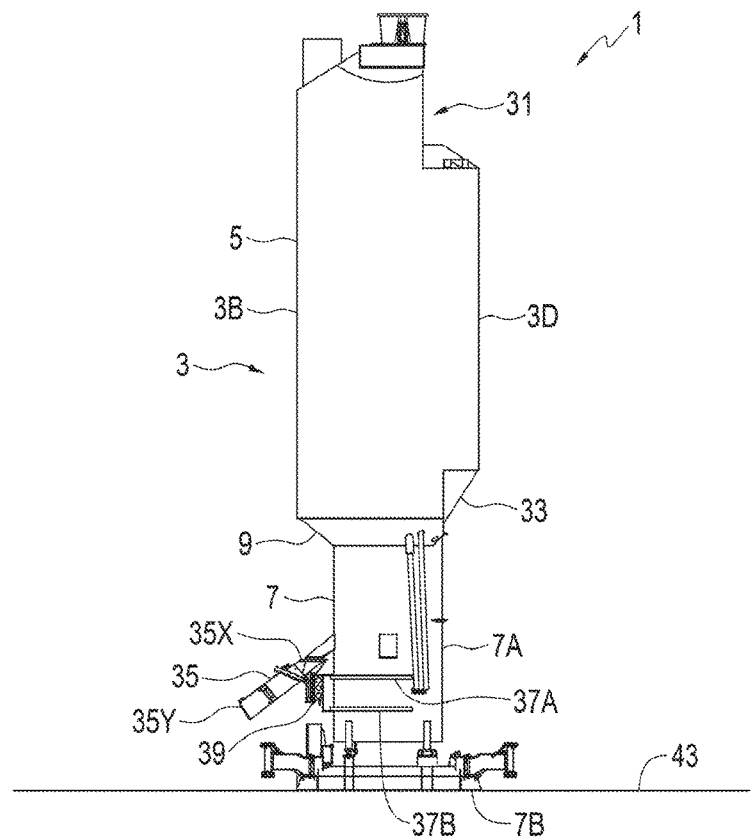
FIG. 1 is a side view of an embodiment of the transportable container apparatus of the present disclosure in a vertical orientation at a work site.

FIGS. 1-5 illustrate an embodiment of a transportable container apparatus 1 of the present disclosure. The apparatus 1 comprises a container assembly 3 comprising a container 5 and a base 7. The container assembly 3 is configured to be transported to a work site in a horizontal transport orientation, shown in FIG. 2, and to be raised to a vertical working orientation with the container 5 extending upward from the base 7 as shown in FIG. 1.

The container 5 comprising a hoppered floor 9 configured, when the container assembly 3 is in the working orientation, to direct granular material in the container 5 to a discharge opening 11 substantially in a center of the hoppered floor 9 of the container 5, and a gate mechanism 13 operative to control a flow of granular material through the discharge opening 11.

A plurality of chutes 15 are fixed to the container assembly 3 and configured such that when the container assembly 3 is in the working orientation, each chute 15 slopes downward and outward from a corresponding chute input 15X, located under a central portion of the hoppered floor 9, to a corresponding chute output 15Y located outside the base 7.

In the illustrated apparatus 1 the base 7 includes a lower base portion 7B configured to rest on a ground surface and an upper base portion 7A extending from the lower base portion 7B to the container 5, and the chutes 15 are mounted to the upper base portion 7A and extend downward and outward from the upper base portion 7A. The upper base portion 7A has a base diameter DB smaller than a container diameter DC of the container 3 and since it is desired to have the container dimensions at the maximum allowable for maximum capacity, the outer ends of the chutes 15 are within the container diameter CD and do not extend beyond the outer wall of the container 5.

Figure 3:
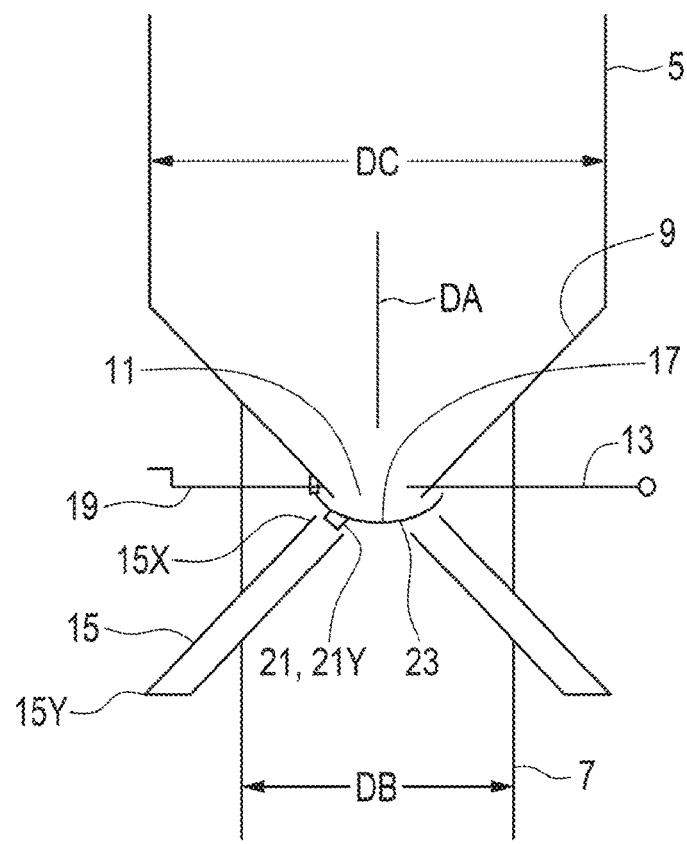
FIG. 3 is a schematic sectional side view of the distributor assembly, hoppered container floor, and chutes of the embodiment of FIG. 1.
Figure 4:
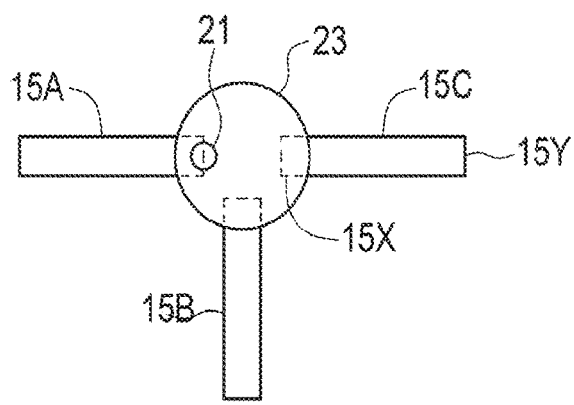
FIG. 4 is a schematic top view of the distributor assembly of the embodiment of FIG. 1.

A distributor assembly 17, schematically illustrated in FIGS. 3 and 4, is mounted under the discharge opening 11 and is operative to receive granular material from the discharge opening 11 and direct the received granular material into any one of the chute inputs 15X. A distributor control 19 operative to maneuver the distributor assembly 17 to direct granular material into a selected chute input 15X.

In the illustrated apparatus 1 the distributor assembly 17 is provided by a distributor spout 21 rotatably mounted about a substantially vertical distributor axis DA to the hoppered floor 9 of the container 5 under the discharge opening 11, and the distributor control 19 is operative to rotate the distributor spout 21 about the spout axis SA. In the illustrated distributor assembly 17, the distributor spout 21 is attached to a catch pan 23 that is rotatable about the spout axis SA. The catch pan 23 catches the granular material flowing from the discharge opening 11 and the spout 21 in turn directs the material into the selected chute input 15X. The distributor control 19 is schematically illustrated as a crank turning a gear engaging the rim of the catch plate 23 but could be of any design as is known in the art.

In the illustrated apparatus 1 the discharge end 21Y of the distributor spout 21 is smaller than the chute inputs 15X and above the chute inputs 15X such that granular material discharged from the discharge end 21Y of the distributor spout 21 is received by the chute input 15X of the selected chute 15 without spillage.

The illustrated apparatus 1 has first, second, and third chutes 15A, 15B, 15C oriented at substantially 90 degrees with respect to each other such that the chute outlets 15Y of respective first, second, and third chutes 15A, 15B, 15C are on respective first, second, and third sides 3A, 3B, 3C of the container assembly 3. The fourth side 3D of the container assembly 3 is configured to rest on a trailer in the horizontal transport orientation.

The illustrated container assembly 3 is configured to rest on gooseneck trailer 25 comprising a load bed 27, and a hitch assembly 29 extending upward from a front end of the load bed 27 and then forward. The upper portion 5A of the container 5 extends forward over the hitch assembly 29. The container 5 is cylindrical and includes an upper recess 31 in the upper portion thereof on the fourth side 3D of the container assembly 3, and when in the horizontal transport orientation, a lower cylindrical portion 5B of the container 5 rests on the load bed 27, and the upper recess 31 extends forward over the hitch assembly 29.

The illustrated apparatus 1 is also configured to rest on a gooseneck trailer 25 where the load bed 27 comprises a rear bed section 27R that is at vertical location higher than a front bed section 27F. The lower cylindrical portion 5B of the container 5 rests on the front bed section 27F and the base 7 of the container assembly 3 extends rearward from the container 5 over the rear bed section 27R, and the bottom end of the base 7 is rearward of the load bed 27. The container 5 here includes a lower recess 33 in a lower portion thereof on the fourth side 3D of the container assembly 3 extending into the floor 9 thereof and the lower recess 33 extends over the rear bed section 27R.

Figure 5:
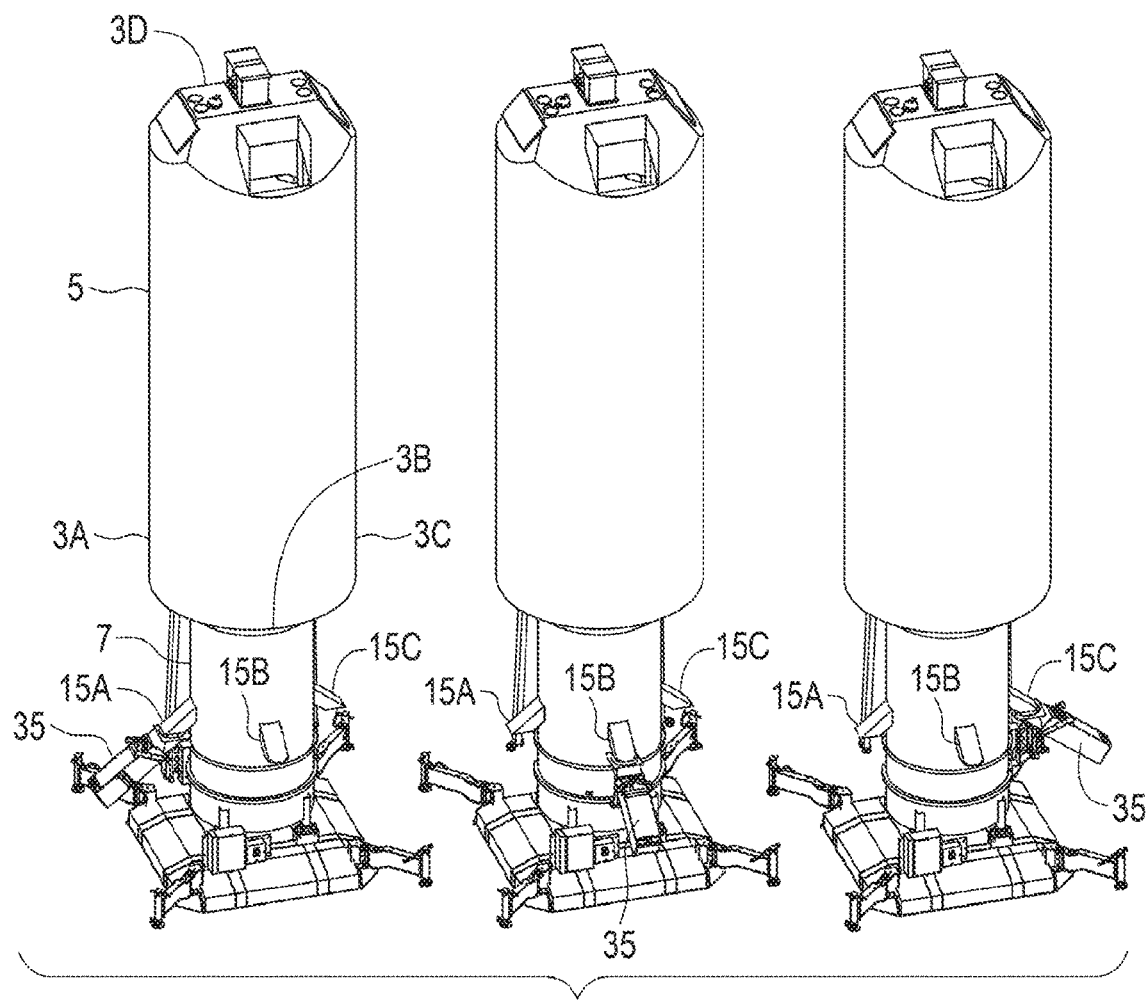
FIG. 5 is a perspective view of three of the embodiments of the container apparatus of FIG. 1 with chutes thereof oriented at 90 degrees with respect to each other and discharging to three different sides of the apparatus.

Configuring the container 5 with a recessed upper portion extending over the hitch assembly 29 provides a significant increase in the volume of the container 5 and thus in its capacity, such that fewer container assemblies 3 are required to store a similar amount of granular material. Granular material can be discharged through any one of the chutes 15A, 15B, 15C as shown in FIG. 5, thus providing flexibility of placement of the apparatuses 1.

Figure 2:
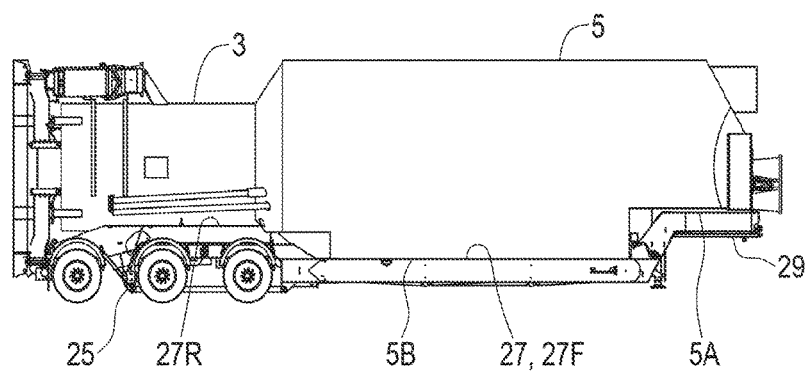
FIG. 2 is a side view of the embodiment of FIG. 1 in a horizontal transport orientation supported on a gooseneck trailer for transport to the work site.

The illustrated apparatus 1 also comprises a chute spout 35 movably mounted to the upper base portion 7A and configured such that the chute spout 35 is movable to operating locations corresponding to each chute 15, and wherein at each operating location a spout input 35X of the chute spout 35 is oriented to receive granular material from the corresponding chute output 15Y, and a spout output 35Y of the chute spout 35 is oriented to discharge the received granular material beyond an outer edge of the lower base portion 7B. The upper base portion 7A is cylindrical and upper and lower horizontal rings 37A, 37B are attached to the vertical walls thereof, and the chute spout 35 is mounted on a roller assembly 39 engaged in the rings 37. For transport the chute spout 35 folds to a transport position within the container diameter CD as shown in FIG. 2 where it does not extend beyond the outer wall of the container 5.

Figure 6:
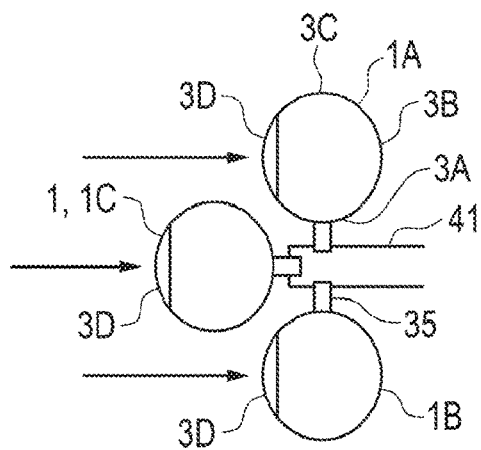
FIG. 6 is a schematic top view of three of the embodiments of the container apparatus of FIG. 1 arranged to discharge granular material into the same receiving apparatus.

FIG. 6 schematically illustrates one possible arrangement of three of the transportable container apparatuses 1A, 1B, 1C of the present disclosure installed at a work site and arranged to discharge granular material into a receiving apparatus 41. The fourth side 3D of each apparatus 1 faces to the left of the arrangement. The trailer carrying the first container apparatus 1A is backed in the direction of the arrow into position to raise the first container apparatus 1A to the illustrated vertical working position and then driven away. Next the trailer carrying the second container apparatus 1B is backed in the direction of the arrow into position to raise the second container apparatus 1B to the illustrated vertical working position and then driven away. Finally the trailer carrying the third container apparatus 1C is backed in the direction of the arrow into position to raise the third container apparatus 1C to the illustrated vertical working position.

The chute spouts 35 on each container apparatus 1 are moved so the spout output 35Y of the corresponding chute spout 35 is oriented to discharge the granular material into the receiving apparatus 41, and the distributor assembly 17 of each container apparatus 1 is moved to deliver granular material to the chute 15 corresponding to the location of the chute spout 35, and all three container apparatuses 1A, 1B, 1C are then ready to be filled with granular material and when desired the contents of each can be discharged into the receiving apparatus 41. The chute spout 35 may telescope and pivot about a vertical axis to adjust a position of the spout output 35Y.

The present disclosure also provides a method of transporting a container 5 and installing same at a work site in a substantially vertical working orientation to deposit granular material from the container 5 into a receiving apparatus 41. The method comprises mounting the container 5 in a container assembly 3 comprising the container 3 with a hoppered floor 9 and a base 7; configuring the hoppered floor 9 such that when the container assembly 3 is in the working orientation, granular material in the container 5 is directed to a discharge opening 11 substantially in a center of the hoppered floor 9 of the container 3; attaching a plurality of chutes 15 to the container assembly and configuring the chutes 15 such that when the container assembly 3 is in the working orientation, each chute 15 slopes downward and outward from a corresponding chute input 15X, located under a central portion of the hoppered floor 9, to a corresponding chute output 15Y; transporting the container assembly 3 to the work site on a trailer 25 in a substantially horizontal transport orientation, and raising the container assembly 3 to the working orientation at the work site with the container 5 extending upward from the base 7 resting on a ground surface 43, wherein a location of the container assembly 3 and a location of the receiving apparatus 41 are arranged such that the receiving apparatus 41 receives granular material from the chute output 15Y of a selected chute 15; depositing the granular material into the container 5; opening the discharge opening 11 and directing granular material from the discharge opening 11 into the chute input 15X of the selected chute 15.

The disclosed transportable container apparatus 1 and method provide increased capacity due to the extension of the container 5 over the hitch assembly 29 of a gooseneck trailer 25 which increase the volume of the container 5. It is highly desirable to provide as much volume and capacity in a given foot print in the crowded work sites where the apparatus 1 will typically be used. The disclosed container apparatus 1 is carried on one side of the trailer 25 and when erected can discharge granular material to any one of the other three sides of the apparatus 1, providing considerable versatility in arranging the containers 5 and receiving apparatuses 41 in a crowded work site with limited access routes.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A transportable container apparatus comprising:
   a container assembly comprising a container and a base, the container assembly configured to be transported to a work site in a substantially horizontal transport orientation, and to be raised to a substantially vertical working orientation with the container extending upward from the base;
   the container comprising a hoppered floor configured, when the container assembly is in the working orientation, to direct granular material in the container to a discharge opening substantially in a center of the hoppered floor of the container, and a gate mechanism operative to control a flow of granular material through the discharge opening;
   a plurality of chutes fixed to the container assembly and configured such that when the container assembly is in the working orientation, each chute slopes downward and outward from a corresponding chute input, located under the discharge opening, to a corresponding chute output;
   a distributor assembly mounted under the discharge opening and operative, when the container assembly is in the working orientation, to receive granular material from the discharge opening and direct the received granular material into a selected one of the chute inputs depending on an orientation of the distributor assembly; and
   a distributor control operative to maneuver the distributor assembly to any one of a plurality of different orientations, wherein the distributor assembly is configured to direct granular material into a selected one of the chute inputs in each respective one of the different orientations.

2. The apparatus of claim 1 wherein the distributor assembly is provided by a distributor spout rotatably mounted about a substantially vertical spout axis to the hoppered floor of the container under the discharge opening, and wherein the distributor control is operative to rotate the distributor spout about the spout axis.

3. The apparatus of claim 2 wherein a discharge end of the distributor spout is smaller than the chute inputs and above the chute inputs such that granular material discharged from the discharge end of the distributor spout is received by the selected chute input.

4. The apparatus of claim 1 comprising first, second, and third chutes oriented at substantially 90 degrees with respect to each other such that respective first, second, and third chute outlets are on respective first, second, and third sides of the container assembly, and wherein a fourth side of the container assembly is configured to rest on a trailer in the horizontal transport orientation.

5. The apparatus of claim 4 wherein the container assembly is configured to rest on a gooseneck trailer comprising a load bed, and a hitch assembly extending upward from a front end of the load bed and then forward, and wherein an upper portion of the container extends forward over the hitch assembly.

6. The apparatus of claim 5 wherein the container is substantially cylindrical and includes an upper recess in the upper portion thereof on the fourth side of the container assembly, and wherein when in the horizontal transport orientation, a lower cylindrical portion of the container rests on the load bed, and the upper recess extends forward over the hitch assembly.

7. The apparatus of claim 6 wherein the load bed of the gooseneck trailer comprises a rear bed section, and wherein the lower cylindrical portion of the container rests on the front bed section and the base of the container assembly extends rearward from the container over the rear bed section.

8. The apparatus of claim 7 wherein a bottom end of the base is rearward of the load bed.

9. The apparatus of claim 8 wherein the container includes a lower recess in a lower portion thereof on the fourth side of the container assembly and wherein the lower recess extends over the rear bed section.

10. The apparatus of claim 1 wherein the base includes a lower base portion configured to rest on a ground surface and an upper base portion extending from the lower base portion to the container, and wherein the chutes are mounted to the upper base portion and extend downward and outward from the upper base portion.

11. The apparatus of claim 10 comprising a chute spout movably mounted to the upper base portion and configured such that the chute spout is movable to operating locations corresponding to each chute, and wherein at each operating location a spout input of the chute spout is oriented to receive granular material from the corresponding chute output, and a spout output of the chute spout is oriented to discharge the received granular material beyond an outer edge of the lower base portion.

12. The apparatus of claim 11 wherein the upper base portion is substantially cylindrical and with upper and lower substantially horizontal rings attached to vertical walls thereof, and wherein the chute spout is mounted on a roller assembly engaged in the upper and lower rings.

13. The apparatus of claim 12 wherein the upper base portion has a base diameter smaller than a container diameter of the container and wherein an outer end of each chute is within the container diameter, and wherein the chute spout folds to a transport position within the container diameter.

14. A method of transporting a container and installing same at a work site in a substantially vertical working orientation to deposit granular material from the container into a receiving apparatus, the method comprising:
   mounting the container in a container assembly comprising the container with a hoppered floor and a base;
   configuring the hoppered floor such that when the container assembly is in the working orientation, granular material in the container is directed to a discharge opening substantially in a center of the hoppered floor of the container;
   attaching a plurality of chutes to the container assembly and configuring the chutes such that when the container assembly is in the working orientation, each chute slopes downward and outward from a corresponding chute input, located under the discharge opening, to a corresponding chute output;
   transporting the container assembly to the work site on a trailer in a substantially horizontal transport orientation, and raising the container assembly to the working orientation at the work site with the container extending upward from the base resting on a ground surface, wherein a location of the container assembly and a location of the receiving apparatus are arranged such that the receiving apparatus receives granular material from the chute output of a selected chute;

depositing the granular material into the container; and opening the discharge opening and directing granular material from the discharge opening into the chute input of the selected chute.

15. The method of claim 14 comprising attaching first, second, and third chutes to the container assembly oriented at substantially 90 degrees with respect to each other such that respective first, second, and third chute outlets are on respective first, second, and third sides of the container assembly, and configuring a fourth side of the container assembly to rest on the trailer in the horizontal transport orientation.

16. The method of claim 15 wherein the trailer is a gooseneck trailer comprising a load bed, and a hitch assembly extending upward from a front end of the load bed and then forward over a fifth wheel of a towing vehicle, and configuring the container assembly to rest on the load bed with an upper portion of the container extending over the hitch assembly.

17. The method of claim 16 wherein the container is substantially cylindrical and comprising providing an upper recess in the upper portion thereof on the fourth side of the container assembly, and configuring the container assembly such that a lower cylindrical portion of the container rests on the load bed, and the upper recess extends over the hitch assembly.

18. The method of claim 17 wherein the load bed of the gooseneck trailer comprises a rear bed section that is at vertical location higher than a front bed section, and configuring the container assembly such that the lower cylindrical portion of the container rests on the front bed section and the base of the container assembly extends rearward from the container above the rear bed section.

19. The method of claim 18 comprising configuring the container assembly such that a bottom end of the base is rearward of the load bed.

20. The method of claim 19 comprising providing a lower recess in a lower portion of the container on the fourth side of the container assembly and configuring the container assembly such that the lower recess extends over the rear bed section.

21. The method of claim 20 comprising movably mounting a chute spout to the base and moving the chute spout to an operating location where a spout input of the chute spout is oriented to receive granular material from the chute output of the selected chute and a spout output of the chute spout is oriented to discharge the received granular material beyond an outer edge of the lower base portion and into the receiving apparatus.

22. A method of manufacturing a container assembly configured to be transported to a work site in a substantially horizontal transport orientation, and to be raised to a substantially vertical working orientation with the container extending upward from the base, the method comprising:

providing a container having a hoppered floor, wherein the hoppered floor defines a discharge opening substantially in a center of the hoppered floor;

mounting a distributor assembly to the container at a position such that, when the container assembly is in the vertical working position, the distributor assembly receives any granular material that passes through the discharge opening;

attaching a base to the container; and configuring a plurality of chutes beneath the distributor assembly such that, when the container assembly is in the working orientation, each chute slopes downward and outward from a corresponding chute input, wherein the distributor assembly comprises a distributor spout that is rotatable about a distributor axis to align with any selected one of the plurality of chute inputs.

23. The method of claim 22, further comprising:

providing a distributor control operative to maneuver the distributor assembly in a manner that causes the distributor spout to rotate about the distributor axis.

24. The method of claim 22, further comprising:

providing a gate mechanism operative to control a flow of granular material through the discharge opening.

25. The method of claim 24, wherein configuring the plurality of chutes comprises:

configuring the plurality chutes such that the respective chute outlets are on respective first, second, and third sides of the container assembly, wherein a fourth side of the container assembly is configured to rest on a trailer in the horizontal transport orientation.

26. The method of claim 25, further comprising:

configuring the container assembly to rest on a gooseneck trailer that comprises: a load bed, a hitch assembly extending upward from a front end of the load bed and then forward, and a rear bed section that is at vertical location higher than the load bed.

27. The method of claim 26, wherein configuring the container assembly to rest on the gooseneck trailer comprises:

providing the container with an upper recess in an upper portion thereof on the fourth side of the container assembly; and providing the container with a lower recess in a lower portion thereof on the fourth side of the container assembly.

28. A method of transporting a container assembly to a work site in a substantially horizontal transport orientation, where the container assembly is configured to be raised to a substantially vertical working orientation at the work site, with the container extending upward from the base, the method comprising:

providing a container assembly comprising:

a container having a hoppered floor, wherein the hoppered floor defines a discharge opening substantially in a center of the hoppered floor, a distributor assembly mounted to the container at a position such that, when the container assembly is in the vertical working position, the distributor assembly receives any granular material that passes through the discharge opening;

a base attached to the container; and a plurality of chutes beneath the distributor assembly such that, when the container assembly, is in the working orientation, each chute slopes downward and outward from a corresponding chute input, wherein the distributor assembly comprises a distributor spout that is rotatable about a distributor axis to align with any selected one of the plurality of chute inputs, wherein the chute outlets are on a first, second, and third side of the container assembly, and wherein the container assembly has an upper recess in an upper portion thereof on a fourth side of the container assembly, and a lower recess in a lower portion thereof on the fourth side of the container assembly; and resting the container assembly on a gooseneck trailer that comprises: a load bed, a hitch assembly extending upward from a front end of the load bed and then forward, and a rear bed section that is at vertical location higher than the load bed, wherein resting the container assembly on the gooseneck trailer comprises: positioning the upper recess to extend over the hitch assembly; and positioning the lower recess to extend over the rear bed section.

29. A method of delivering a granular material from a container into a receiving apparatus at a work site, the method comprising:

obtaining a container assembly that includes the granular material, the container assembly comprising:

a container having a hoppered floor, Wherein the hoppered floor defines a discharge opening substantially in a center of the hoppered floor;

a distributor assembly mounted to the container at a position such that, when the container assembly is in the vertical working position, the distributor assembly receives any granular material that passes through the discharge opening, wherein the distributor assembly comprises a distributor spout that is rotatable about a distributor axis;

a base attached to the container;

a plurality of chutes beneath the distributor assembly such that, when the container assembly is in the working orientation, each chute slopes downward and outward from a corresponding chute input, wherein the distributor spout is rotatable to align with any selected one of the plurality of chute inputs, and a distributor control operative to maneuver the distributor assembly to change an alignment of the distributor spout; and manipulating the distributor control to change an alignment of the distributor spout from a first one of the plurality of chute inputs to a second one of the plurality of chute inputs.

* * * * *